May 4, 1965   J. J. SABATINI   3,181,375
ENGINE STARTER DRIVE
Filed April 1, 1963
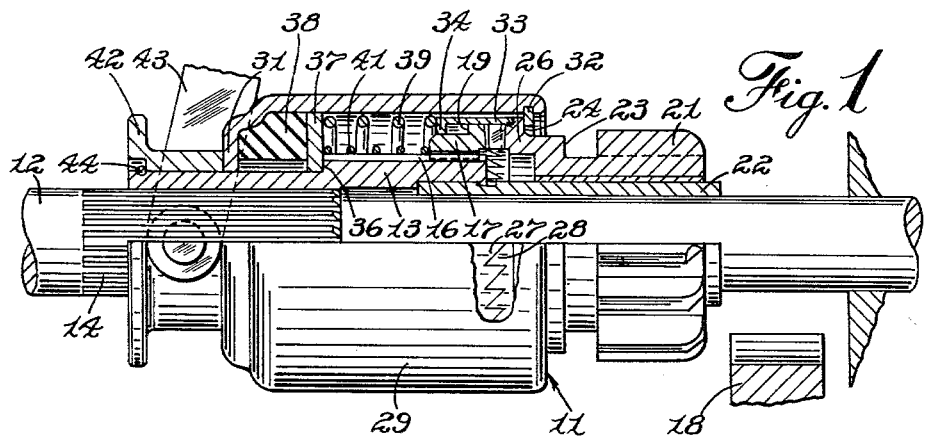
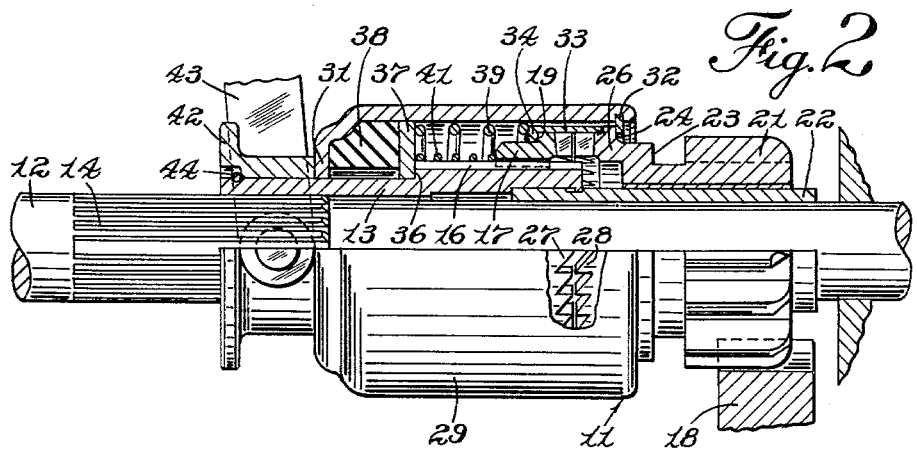
WITNESS:
Esther M. Stockton
INVENTOR.
John J. Sabatini
BY John Phillips Ryan
ATTORNEY

United States Patent Office 3,181,375
Patented May 4, 1965

3,181,375
ENGINE STARTER DRIVE
John J. Sabatini, Horseheads, N.Y., assignor to The Bendix Corporation, Elmira Heights, N.Y., a corporation of Delaware
Filed Apr. 1, 1963, Ser. No. 269,434
4 Claims. (Cl. 74—6)

The present invention relates to an engine starter drive for an internal combustion engine and more particularly to a drive of the positive shift type including therein a dentil clutch adapted to provide driving, overrunning and indexing functions.

In the prior art developments of the drives of this character various dentil clutch configurations using deep or shallow dentil engagement have been utilized in an effort to overcome poor dentil life and poor clutch spring life. In the drives having deep dentil clutch engagement, the spring life has been noticeably poor. In those drives a single clutch spring, which is a relatively heavy spring, serves as a clutch meshing spring and a biasing means for properly positioning the clutch and pinion assemblies relative to the drive housing. The spring is in direct contact with the driving clutch member and no lost motion exists between the clutch member and the spring itself. During initial cranking operations the engine passes through a multitude of compression peaks. Immediately after each compression peak the engine, due to the effect of the compression, will momentarily drive the pinion at a speed greater than the speed of the starting motor causing the clutch members to overrun. These momentary clutch overruns will cause numerous flexures of the clutch biasing spring. Since the spring is relatively heavy, numerous flexures of this type are undesirable and adversely affect normal spring life. A relatively lighter clutch spring could be used and this lighter spring would be more desirable for biasing the clutch members into engagement. A light spring would, however, be incapable of asserting sufficient bias on the clutch and pinion assemblies during the indexing functions and for properly positioning these assemblies. The light spring's detrimental attributes far outweigh its favorable attributes and thus eliminate it from consideration. In those drives having shallow dentil clutch engagement lost motion is inherently provided by the unused dentil depth and the detrimental and excessive spring flexure problem is somewhat eliminated. The use of shallow dentil clutch engagement does have a serious drawback in that the clutch dentil engagement approaches a peak-to-peak engagement. Peak-to-peak dentil engagement materially lessens the torque transmitting capabilities of the clutch and the dentils themselves are subjected to excessive shear stresses. It is, therefore, an object of the present invention to provide an engine starter drive including a dentil clutch member adapted for deep dentil engagement and having provided therein means for improving clutch spring life and for insuring longer clutch dentil life.

It is another object of the present invention to provide starter gearing for internal combustion engines which is simple, efficient, reliable and economical to manufacture and fabricate.

It is another object of the present invention to provide a dentil clutch for starter gearing including means supported by the driven clutch member adapted to engage the driving clutch member after the clutch members have been separated a predetermined amount to permit deep dentil clutch engagement and provide a degree of lost motion between a light and a heavy clutch spring.

With the above and other objects in view which will appear as the description proceeds, this invention resides in the novel construction, combination and arrangement of parts substantially as hereinafter described and more particularly defined in the appended claims, it being understood that such changes in the precise embodiment of the herein disclosed invention may be made as come within the scope of the claims.

The accompanying drawing illustrates a single example of a physical embodiment of the invention constructed according to the best mode so far devised for the practical application of the principles thereof, and in which:

FIGURE 1 is a side elevational view, partly in section and broken away, of a preferred embodiment of the invention showing the drive in an idle position and an annular spacer element positioned so as to permit deep dentil clutch engagement and provide lost motion between composite clutch biasing means; and, FIGURE 2 is a view similar to FIGURE 1 showing the drive in an engaged overrunning position with the annular spacer element effectively limiting the axial separation between the driving and driven clutch members.

Referring now to the drawing wherein like reference characters represent like parts in the two views, in FIGURE 1 there is illustrated a starter drive for an internal combustion engine, generally designated 11, mounted on a power shaft 12 of a starting motor (not shown). The drive includes a sleeve 13 slidably but non-rotatably secured to the power shaft by means of straight splines 14. The external surface of the forward or right-hand extremity of the sleeve has helical splines 16 formed thereon upon which a driving clutch member 17 is threaded and adapted for movement in directions toward and away from a gear 18 of the engine to be started. The driving clutch member has a radially outwardly extending shoulder 19 for a purpose to be hereinafter explained.

A pinion 21 is slidably journalled on a sleeve bearing 22 secured to the sleeve and supported on the reduced diameter extremity of the power shaft. The pinion is adapted for movements into and out of engagement with the gear 18. The sleeve bearing under the pinion permits the pinion to be moved toward the engine gear regardless of contamination on the power or armature shaft 12. The inner or left-hand extremity of the pinion is radially offset as at 23 and 24 to provide a driven clutch member 26. The opposing or adjacent faces of the clutch members 17 and 26 are provided with complementing inclined torque transmitting dentil teeth 27 and 28, respectively. The dentils are of the saw-toothed variety to provide a one-way overrunning clutch connection.

A barrel shaped housing 29, having a closed and an open end, is slidably supported at its closed end 31 on the external surface of the sleeve 13. A lock ring 32 seated in a notch adjacent the open end of the housing has sufficient radial length to engage the pinion offset 24 when the pinion has moved to an extreme right-hand position relative to the housing to thereby confine the clutch elements within the housing cavity.

An annular spacer element 33 secured to the driven clutch member 26, as by brazing, extends in a rearward direction and is juxtaposed over the clutch members' teeth. The spacer element has its free extremity radially inturned as at 34 and adapted to engage the driving clutch member's shoulder 19 to thereby effectively limit the amount of rearward axial separation possible between the driving and driven clutch members. The axial extent of the sleeve is sufficient to allow the clutch dentils to separate and overrun.

The sleeve 13 is provided with a radial shoulder 36 intermediate its extremities to provide an abutment for a disc or washer 37 slidably journalled on the sleeve. A resiliently yieldable cylinder 38, preferably of an elastically deformable material such as rubber, is compressively confined between the disc and the closed end of the housing. A first or heavy spring 39 is compressively confined between the disc and the inturned edge of the spacer element to normally bias the driven clutch member into engagement with the lock ring 32. The spring 39 will also be operative during a portion of clutch overrun and clutch indexing operations. A second spring 41 which is relatively light as compared to spring 39 is compressively confined between the disc and the driving clutch member to normally bias the driving clutch into operative engagement with the driven clutch member.

Means for moving the sleeve, housing and associated parts toward and away from the engine gear are provided comprising a shift collar 42 which combines with the housing closed end to provide a swivel seat for a forked member 43. The collar is confined on the sleeve by a thrust ring 44. It is understood, as is well known in the art, that the forked member combines with other means (not shown) for controlling the energization of the starting motor.

In operation, when it is desired to crank the engine, the forked member is actuated by means not forming a part of this invention and through the swivel connection with the collar 42 will axially urge the housing 29 and its associated parts toward the gear 18 of the engine to be started. Axial displacement of the housing will be transferred to the sleeve 13 by the compression element 38, disc washer 37 and shoulder 36. This axial movement will also be simultaneously transferred to the clutch members 17 and 26 by the compression springs 41 and 39, respectively. The extent of bias exerted by the spring 39 will be limited by the spacer element 33. The driven clutch member and spacer element will be urged into engagement with the lock ring 32 and, of course, the pinion will be urged toward the engine gear. The sleeve bearing 22, since it is secured to the sleeve 13, will move toward the engine gear regardless of contamination on the armature shaft. The pinion journalled thereon will also move toward the gear 18 without being retarded. If the pinion were positioned directly on the armature shaft, any contaminants on the shaft would retard or halt pinion axial movement but the remainder of the drive elements would continue to move forward. Pinion retardation would cause the driving clutch member to traverse the helical splines thereby indexing the pinion prior to tooth abutment. If tooth abutment subsequently occurred there would not be adequate indexing travel left and the tooth abutment could not be cleared. The driving clutch will be urged by the spring 41 and threaded on spline 16 into operative engagement with the driven clutch member. The dentil teeth 27, 28 will mesh to their full extent but the driving clutch member will be capable during clutch overrun of axial movement relative to the driven clutch member within the axial limits defined by the spacer element 33, the inturned edge 34 thereof and the clutch shoulder 19. Should the rearward axial movement of the driving clutch member be extremely violent, as would occur when the engine becomes operative and the pinion is rotated at speeds greatly in excess of the armature speed, then the spring 41 will be incapable of completely coping with the forces exerted and the spring 39 will be called into limited action to additionally dampen the clutch action.

If tooth abutment should occur between the pinion 21 and the engine gear 18, then the pinion and clutch members will be halted but the movement of the housing and sleeve will continue toward the engine gear thereby causing relative movement between the clutch members and the sleeve and compressing the springs 39 and 41. Since the driving clutch is supported on helical splines, this movement will be both axial and rotational thereby causing the pinion gear teeth to be rotated sufficiently to clear the abutting engagement with the engine gear teeth. Thereafter the compression springs will reassert themselves and return the pinion and clutch members to their proper position relative to the sleeve and housing.

After the drive has engaged the engine gear, the starter motor will be energized and cranking torque will be transmitted from the power shaft 12 through the splines 14 to the sleeve 13 and thence through the clutch members 17, 26 to the pinion 21 and engine gear 18. The engine, due to inertia, will initially resist starting motor torque and decelerate the starting torque. The engine inertia will cause the driving clutch member to be threaded toward the engine gear. Since the clutch members are engaged and the driven clutch member 26 is in an abutting engagement with the lock ring 32, the forward movement of the clutch members will automatically be transferred to the housing 29 by the lock ring causing the housing to move forward relative to the sleeve. The forward movement of the housing compresses the element 38. The transferred deceleration torque is absorbed by the compression element 38 but after the engine inertia has been overcome, the stored deceleration energy will be returned to the drive.

During the initial phases of engine cranking the engine will pass through a multitude of compression peaks. Immediately after each compression peak the engine, due to the driving effect of the compression, will propel the pinion gear at a speed greater than the speed of the starting motor thereby causing the clutch members to momentarily overrun. During these momentary overruns the driving clutch member will move back and forth on the helical splines 16 against the bias of spring 41 within the confines established by the spacer element 33. Since these overruns are momentary and not of great force, the driving clutch will not be propelled with any great force and the spring 41 can easily accommodate the clutch movements. Since the spring 41 is a light spring, it will withstand the amount and number of flexures imposed upon it without causing detrimental spring wear and will free the heavy spring 39 from performing detrimental dampening service. This would not be true if the spring 39 were in direct contact with the driving clutch member. After the engine has started and the pinion is propelled by the engine at a speed greater than the speed of the starting motor, the driving clutch members will again be cammed rearwardly against the bias of the of the spring 41 by the overrunning dentil teeth. The force generated will be of great force and if unrestrained will wear out the light clutch spring. The spacer element 33 effectively limits the extent of free driving clutch movement by reason of the inturned edge 34 engaging the shoulder 19. The spacer thus effectively limits the degree of spring flexure imposed on the light spring and becaue the clutch member axial separation is limited, the spring will be more effective in urging the clutch members into operative engagement and will provide smoother overrunning clutch action. An incidental benefit will be that the dentils will more completely mesh thereby eliminating peak-to-peak dentil engagement and giving better and longer dentil life.

I claim:

1. Starting apparatus for an internal combustion engine comprising, in combination:

a starting motor including a power shaft;

a sleeve slidably but non-rotatably secured to the power shaft, said sleeve having external splines formed on one extremity thereof;

a pinion slidably journalled for axial movement relative to the power shaft adapted for movement into and out of engagement with a gear of the engine to be started;

a driven clutch member secured to the pinion;

a driving clutch member threaded on the sleeve splines, said clutch members having complementing inclined torque transmitting teeth adapted to provide an overrunning and an indexing clutch connection;

a barrel housing, having an open end, slidably supported adjacent the other extremity of the sleeve and spatially encompassing the clutch members;

means within the housing adjacent the open end thereof adapted for engagement with the driven clutch member for confining the clutch members within the housing;

means in the housing for normally biasing the clutch members into engagement and toward the means confining the clutch members within the housing;

means supported by the driven clutch adapted to continuously overlie portions of the driving clutch members for limiting the axial separation between the clutch members during overrun; and, means for actuating the housing and sleeve toward and away from the engine gear for controlling the energization of the starting motor.

2. Starting apparatus of the type set forth in claim 1 wherein:

the splines on said one extremity of the sleeve supporting the driving clutch member are helical;

the means for biasing the clutch members into engagement includes elastic means adapted to utilize the deceleration torque of the starting motor at the initiation of the cranking operation;

the driving clutch member includes radial shoulder means; and, the means for limiting the axial separation between the clutch members comprise an annular spacer element, said spacer element having an inturned edge portion adapted to engage the driving clutch shoulder means during overrun.

3. Starting apparatus for an internal combustion engine comprising, in combination:

a starting motor having a power shaft;

a sleeve having a straight splined connection to the shaft, said sleeve adapted to be axially but non-rotatably movable relative to the power shaft;

helical splines formed on one extremity of the sleeve;

a pinion slidaby journalled for axial movement relative to the power shaft for movement into and out of engagement with the gear of the engine to be started;

a driving clutch member, including radial shoulder means, supported on the sleeve and adapted to be threaded on the helical splines toward and away from the engine gear;

a driven clutch member, including an annular spacer element, fixedly secured to the pinion, said annular spacer element including an inturned edge portion adapted to engage the driving clutch member shoulder means during overrun, said clutch members including complementing inclined torque transmitting teeth adapted to provide an overrunning connection;

a barrel housing, including an open and a closed end, slidably supported at the closed end adjacent the other extremity of the sleeve, said housing spatially encompassing the clutch members;

a lock ring in the housing adjacent the open end thereof adapted for engagement with the driven clutch member for confining the clutch members within the housing;

shoulder means on the sleeve intermediate the extremities thereof;

a disc member supported within the housing adapted to abut the shoulder means;

resiliently yieldable means interposed between the disc member and the closed end of the housing adapted to resist the axial movements of the housing relative to the sleeve responsive to clutch member movement toward the engine gear and the resulting force generated against the lock ring whereby the deceleration torque of the starting motor at the initiation of the starting operation is reduced and utilized;

spring means compressively confined between the disc and the clutch members for normally biasing the clutch members to operative positions; and, means for actuating the housing and sleeve toward and away from the engine gear and for controlling the energization of the starting motor.

4. Starting apparatus of the type set forth in claim 3 wherein the spring means for biasing the clutch members comprises:

a first spring member compressively confined between the disc and the spacer element's inturned edge; and, a second spring member compressively confined between the disc and the driving clutch member for normally biasing the driving clutch into operative engagement with the driven clutch member, said second spring being lighter and more flexible relative to the first spring member.

References Cited by the Examiner
UNITED STATES PATENTS 1,892,056 12/32 Jackson et al. _____ 74—6
2,450,246 9/48 Miller _____ 74—9

BROUGHTON G. DURHAM, *Primary Examiner.*